(12) United States Patent
Miller et al.

(10) Patent No.: US 9,854,340 B2
(45) Date of Patent: Dec. 26, 2017

(54) DETACHABLE AUDIO SYSTEM FOR HEAD-MOUNTED DISPLAYS

(71) Applicant: Oculus VR, LLC, Menlo Park, CA (US)

(72) Inventors: Robin Michael Miller, Redmond, WA (US); Jared I. Drinkwater, Auburn, WA (US); Peter Wesley Bristol, Seattle, WA (US); Blake F. Andersen, Seattle, WA (US); Joseph Patrick Sullivan, Issaquah, WA (US); Lesley Ribble Magrath, Seattle, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 15/649,517

(22) Filed: Jul. 13, 2017

(65) Prior Publication Data

US 2017/0311064 A1    Oct. 26, 2017

Related U.S. Application Data

(63) Continuation of application No. 14/749,403, filed on Jun. 24, 2015, now Pat. No. 9,716,932.

(60) Provisional application No. 62/174,298, filed on Jun. 11, 2015.

(51) Int. Cl.
| | |
|---|---|
| *G06F 3/16* | (2006.01) |
| *H04R 1/02* | (2006.01) |
| *H04R 1/10* | (2006.01) |
| *F16M 13/04* | (2006.01) |
| *A44B 17/00* | (2006.01) |

(52) U.S. Cl.
CPC ........... *H04R 1/028* (2013.01); *A44B 17/007* (2013.01); *A44B 17/0076* (2013.01); *F16M 13/04* (2013.01); *G06F 3/16* (2013.01); *H04R 1/1066* (2013.01); *H04R 2499/15* (2013.01)

(58) Field of Classification Search
CPC ........... G02C 9/04; G02C 11/10; G06F 3/167; H04M 1/6066
See application file for complete search history.

(56) References Cited

U.S. PATENT DOCUMENTS

| | | | |
|---|---|---|---|
| 5,003,300 A | 3/1991 | Wells | |
| 5,551,089 A * | 9/1996 | Whidden | ................ A61F 11/14 128/866 |

(Continued)

OTHER PUBLICATIONS

Miller, Office Action, U.S. Appl. No. 14/749,403, dated Oct. 13, 2016, 16 pgs.

(Continued)

*Primary Examiner* — Kevin M Nguyen
(74) *Attorney, Agent, or Firm* — Morgan, Lewis & Bockius LLP (57) ABSTRACT

A detachable coupling structure for an audio system is disclosed. The detachable coupling structure includes a base and a plurality of posts, extending from the base, to couple to a strap. The detachable coupling structure also includes a spring, contacting the base, to detach the plurality of posts from the strap when the plurality of posts decouple from the strap. The detachable coupling structure further includes a spacer through which the plurality of posts extends. The spring contacts the spacer.

18 Claims, 8 Drawing Sheets

(56) References Cited

U.S. PATENT DOCUMENTS

2012/0033142 A1* 2/2012 Thomson ............... G02B 7/002
                                                     348/838
2012/0105740 A1   5/2012 Jannard
2016/0054571 A1   2/2016 Tazbaz

OTHER PUBLICATIONS

Miller, Notice of Allowance, U.S. Appl. No. 14/749,403, dated Mar. 16, 2017, 5 pgs.

* cited by examiner

DETACHABLE AUDIO SYSTEM FOR HEAD-MOUNTED DISPLAYS

RELATED APPLICATIONS

This application is a continuation of U.S. Non-Provisional application Ser. No. 14/749,403, filed Jun. 24, 2015, entitled "Detachable Audio System for Head-Mounted Displays," which claims priority to U.S. Provisional Patent Application Ser. No. 62/174,298, filed Jun. 11, 2015, entitled "Detachable Audio System for Head-Mounted Displays," which applications are incorporated by reference in their entireties.

TECHNICAL FIELD

This application relates generally to wearable technology and virtual-reality technology, including but not limited to a detachable audio system for a head-mounted display.

BACKGROUND

Virtual-reality head-mounted displays have wide applications in various fields, including engineering design, medical surgery practice, military simulated practice, and video gaming. For example, a user wears a virtual-reality head-mounted display integrated with audio headphones while playing video games so that the user can have an interactive experience in an immersive virtual environment.

However, it may be difficult for a user to properly adjust and comfortably wear the head-mounted displays and the integrated audio systems using the existing technology, which may negatively affect the user's experience.

SUMMARY

The embodiments of the present disclosure provide detachable audio systems for a head-mounted display. In accordance with some embodiments, the detachable audio system includes a speaker, an arm coupled to the speaker, a strap connector including a first side coupled to the arm and a second side opposite to the first side, and a coupling subsystem coupled to the second side of the strap connector and to couple to a strap for the head-mounted display. The coupling subsystem includes a base, a plurality of posts, and a spring. The base includes a first side engaged with the second side of the strap connector and a second side opposite to the first side. The plurality of posts extends from the second side of the base to couple to the strap. The spring contacts the second side of the base and is to detach the detachable audio system from the strap when the plurality of posts decouple from the strap.

In accordance with some embodiments, a detachable coupling structure to detachably couple an audio system to a head-mounted display system is disclosed. The detachable coupling structure includes a base and a plurality of posts. The plurality of posts extends from the base and is to couple to a strap of the head-mounted display. Each post of the plurality of the posts includes a tip to be inserted into the strap, a groove to engage with the strap, and a spring, which contacts the base, to detach the plurality of posts from the strap when the plurality of posts decouple from the strap.

In accordance with some embodiments, a head-mounted display system is disclosed. The head-mounted display system includes a head-mounted display, a strap for mounting the head-mounted display on the user's head, an audio subsystem integrated with the head-mounted display, and a coupling subsystem. The strap includes first and second rigid segments coupled to a semi-rigid segment from first and second ends of the semi-rigid segment respectively. The semi-rigid segment is to conform to a portion of the user's head. The audio subsystem includes a speaker, an arm coupled to the speaker, and a strap connector including a first side coupled to the arm and a second side opposite to the first side. The coupling subsystem, which couples the strap connector to the first rigid segment of the strap, includes a base including a first side engaged with the second side of the strap connector and a second side opposite to the first side. The coupling subsystem further includes a plurality of posts extending from the second side of the base to couple to the first rigid segment of the strap. The coupling subsystem also includes a spring, contacting the second side of the base, to detach the coupling subsystem from the strap when the plurality of posts release from the first rigid segment of the strap.

Various advantages of the present application are apparent in light of the descriptions below.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

Like reference numerals refer to corresponding parts throughout the several views of the drawings.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first segment could be termed a second segment, and, similarly, a second segment could be termed a first segment, without departing from the scope of the various described embodiments. The first segment and the second segment are both segments, but they are not the same segment.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
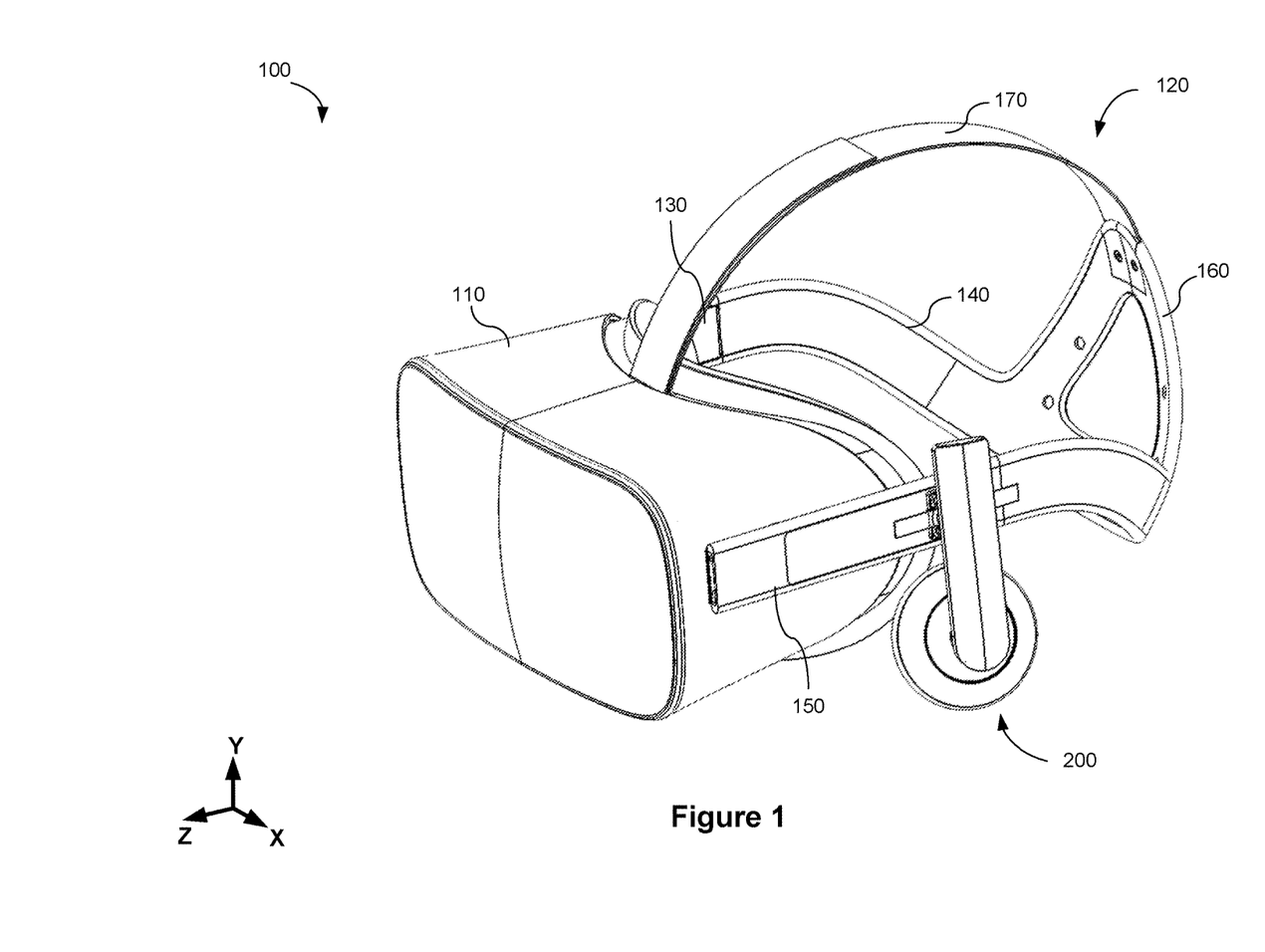
FIG. 1 is a perspective view of a head-mounted display system comprising a head-mounted display integrated with an audio subsystem in accordance with some embodiments.

FIG. 1 is a perspective view of a head-mounted display system 100 in accordance with some embodiments. In some embodiments, the head-mounted display system 100 comprises a head-mounted display 110 integrated with an audio subsystem 200. Although not shown due to the perspective, the head-mounted system 100 may have two audio subsystems located on left and right sides to provide audio signals to the user's left and right ears. Each of the left and right audio subsystems may use substantially symmetric structures for coupling the speaker to a corresponding rigid segment of the strap 120. The audio subsystem 200 will be discussed in detail with reference to the following figures.

In some embodiments, the head-mounted display system 100 also comprises a strap 120 for mounting the head-mounted display 110 on a user's head. In the example of FIG. 1, the strap 120 comprises a rigid segment 130, a semi-rigid segment 140, and a rigid segment 150 that are coupled to each other to adjustably wrap around side and back portions of the user's head.

In some embodiments, the strap 120 comprises a single and continuous semi-rigid segment 140 including two arc portions, and each arc portion is to extend from above a user's ears to below the user's occipital lobe to conform to a portion of the user's head. Alternatively, the strap 120 may comprise two separate and symmetric semi-rigid segments each including an arc portion.

In some embodiments, the rigid segments 130 and 150 are coupled to the head-mounted display 110 and positioned on respective sides of the user's head to extend along the lateral dimension (e.g., Z dimension in FIG. 1). The strap 120 may further include flexible segments (not shown) that are stretchable within the rigid segments 130 and 150 respectively to adjust the strap 120 in accordance with the user's head.

In some embodiments, the strap 120 comprises a back piece 160 coupled with the semi-rigid segment 140 to rest against the back of the user's head (e.g., around the user's occipital lobe).

In some embodiments, the strap 120 comprises a top strap 170 coupled to the back piece 160 and the head-mounted display 110 to adjustably conform to the top of the user's head when the user is wearing the head-mounted display.

In some embodiments, various electrical connection mechanisms (e.g., flat flexible circuits and/or electric cables) are used in the head-mounted display system 100 to provide power management and/or other functionalities to the head-mounted display 110 and the audio subsystem 200. For example, the head-mounted display 110 is integrated with the audio subsystem 200 using suitable electrical connection mechanisms to provide both visual and audio virtual-reality experiences to the user.

Various embodiments of the strap system 120 and the head-mounted display system 100 are described in U.S. patent application Ser. No. 14/603,335, filed on Jan. 22, 2015, and U.S. patent application Ser. No. 14/681,001, filed on Apr. 7, 2015, the disclosures of which are incorporated herein by reference in their entireties.

Figure 2A:
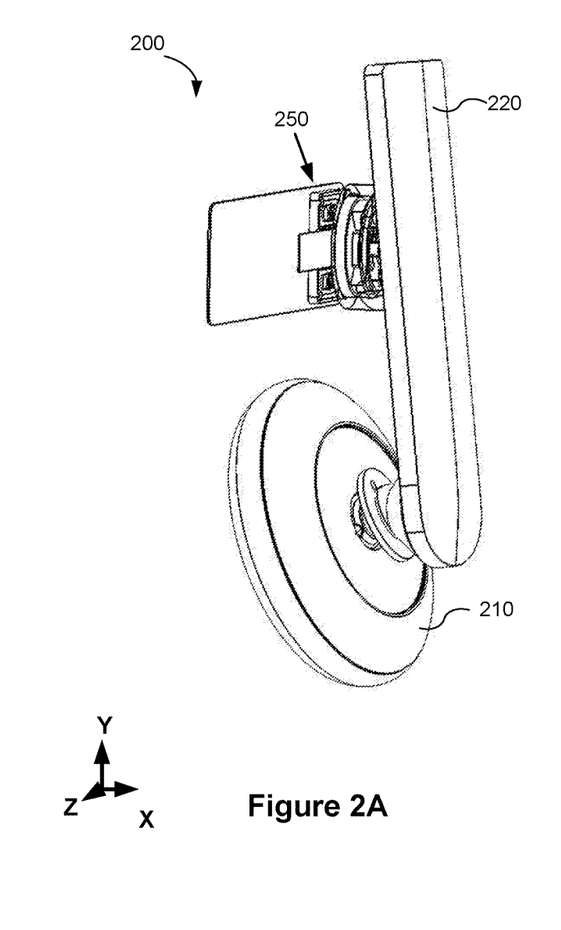
FIGS. 2A-2B are perspective views of an audio subsystem for a head-mounted display system in accordance with some embodiments.
Figure 2B:
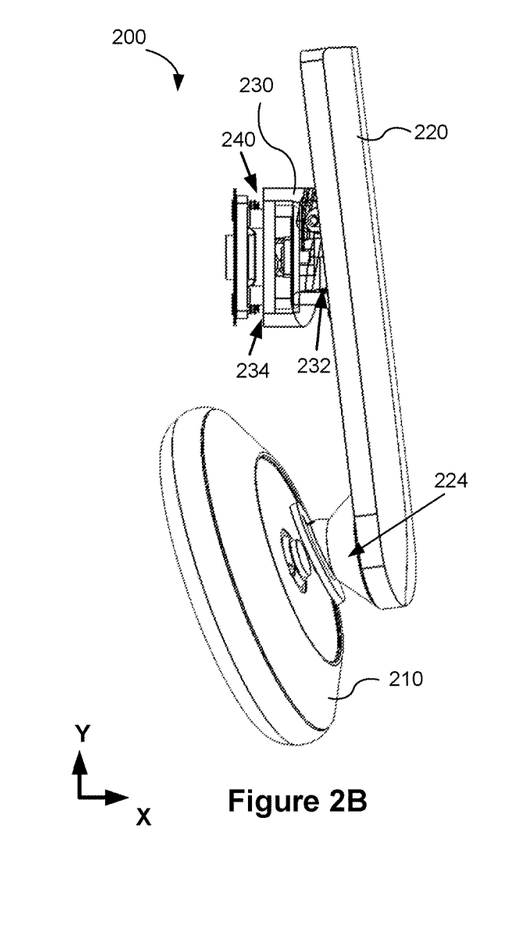

FIGS. 2A-2B are perspective views of the audio subsystem 200 for the head-mounted display system 100 in accordance with some embodiments. The audio subsystem 200 comprises a speaker 210, an arm 220 coupled to the speaker 210, a strap connector 230 coupled to the arm 220, and a coupling subsystem 240 coupled to the strap connector 230. The coupling subsystem 240 is releasably coupled to the strap 120 (e.g., the rigid segment 150) for the head-mounted display system 100 as illustrated in FIG. 1.

The speaker 210 may be an on-ear headphone speaker, an around-ear headphone speaker, an over-ear headphone speaker, an in-ear headphone speaker, an earbud speaker, or any other suitable style of speaker.

As shown in FIG. 2B, the strap connector 230 and the speaker 210 are coupled to the arm 220 in respective portions distributed along the length (e.g., Y dimension in FIGS. 2A-2B) of the arm 220. The arm 220 may further comprise a four-bar linkage to provide inward and outward movement of the speaker with respect to the user's ear. Various embodiments of the four-bar linkage and other possible structures of the arm 220 are described in U.S. patent application Ser. No. 14/627,639, filed on Feb. 20, 2015, the disclosure of which is incorporated herein by reference in its entirety.

The strap connector 230 includes a side 232 coupled to the arm 220 and a side 234 coupled to the coupling subsystem 240, and the side 232 and the side 234 are opposite to each other along the X dimension as illustrated in FIG. 2B. Various embodiments of the strap connector 230 are described in U.S. patent application Ser. No. 14/627,639.

Figure 3A:
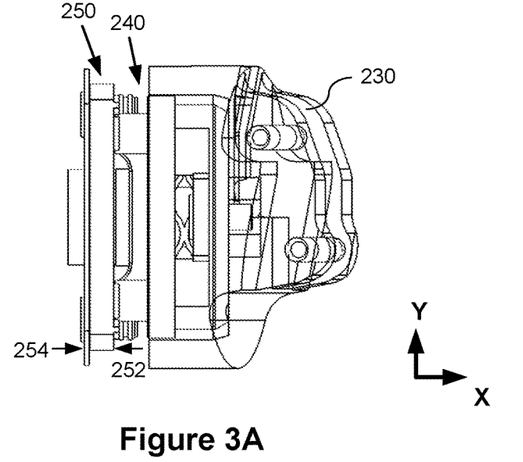
FIG. 3A is a side view of a strap connector coupled with a coupling subsystem in accordance with some embodiments.

FIG. 3A is a side view of the strap connector 230 coupled with the coupling subsystem 240 in accordance with some embodiments. FIG. 3A also illustrates a receiving structure 250 including a side 252 coupled to the coupling subsystem 240 and a side 254 to couple to the strap 120 (e.g., the rigid segment 150 of FIG. 1). The side 252 and the side 254 are opposite to each other along the X dimension as illustrated in FIG. 3A. In some embodiments, the receiving structure 250 is a component of the strap 120 (e.g., the rigid segment 150) that is fixedly connected to the strap 120. Alternatively, the receiving structure 250 is coupled to the strap 120 using any suitable structure; once coupled, the receiving structure 250 may be considered part of the strap 120.

Figure 3B:
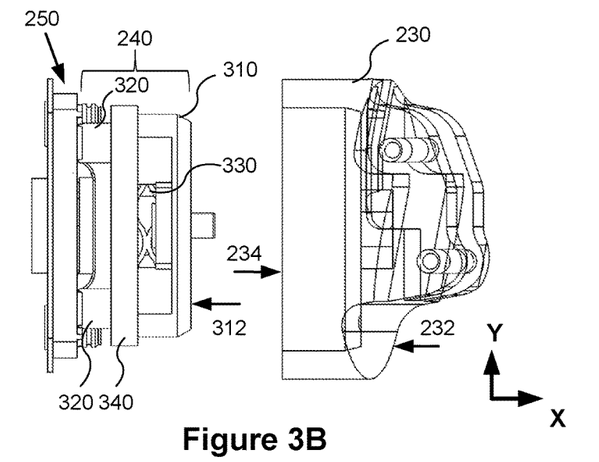
FIG. 3B is a side view of a strap connector and a coupling subsystem in accordance with some embodiments.

FIG. 3B is a side view illustrating the strap connector 230 decoupled from the coupling subsystem 240 in accordance with some embodiments. The coupling subsystem 240 comprises a base 310, one or more posts 320 (e.g., a pair of posts) extending from the base 310 and through a spacer 340 to couple to the receiving structure 250, and a spring 330 positioned between the base 310 and the spacer 340 to deform (e.g., to release from a compressed length to a natural length) to detach the coupling subsystem 240 from the receiving structure 250 when the posts 320 decouple from the receiving structure 250.

Figure 3C:
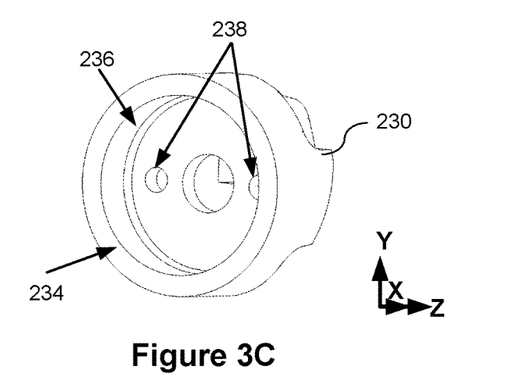
FIG. 3C is a perspective view of a strap connector in accordance with some embodiments.

FIG. 3C is a perspective view of the strap connector 230 in accordance with some embodiments. As shown in FIGS. 3A-3C, when the coupling subsystem 240 is coupled with the strap connector 230, a side 312 of the base 310 is engaged with a recessed portion 236 of the side 234 of the strap connector 230. For example, the side 312 of the base 310 is flush to engage with the recessed portion 236 of the side 234 of the strap connector 230. The strap connector 230 may further include one or more recessed portions 238 (e.g., circular recessed portions 238) on the side 234 and within the recessed portion 236 to receive coupling elements (e.g., screws) extending from the side 312 of the coupling subsystem 240 when the coupling subsystem 240 is engaged with the strap connector 230.

Figure 3D:
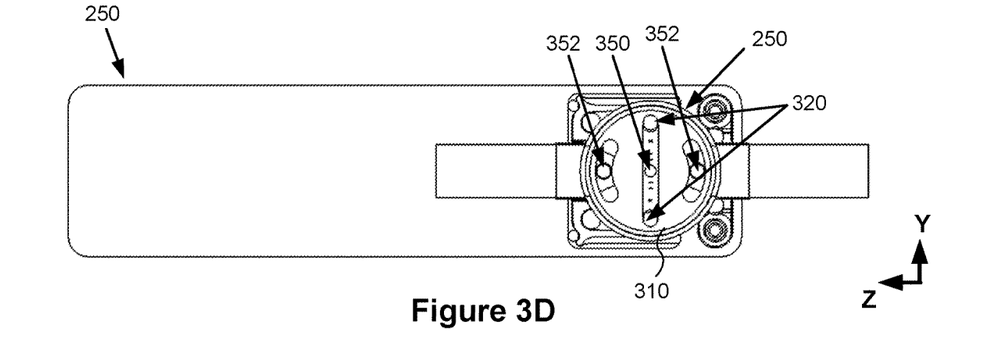
FIG. 3D is a top view of a coupling subsystem coupled with a receiving structure in accordance with some embodiments.

FIG. 3D is a top view of the coupling subsystem 240 coupled with the receiving structure 250 in accordance with some embodiments. As shown in FIG. 3D, one or more posts 320 are used to couple the coupling subsystem 240 with the receiving structure 250. Furthermore, the coupling subsystem 240 may include one or more coupling elements 350 and 352 (e.g., screws).

Figure 3E:
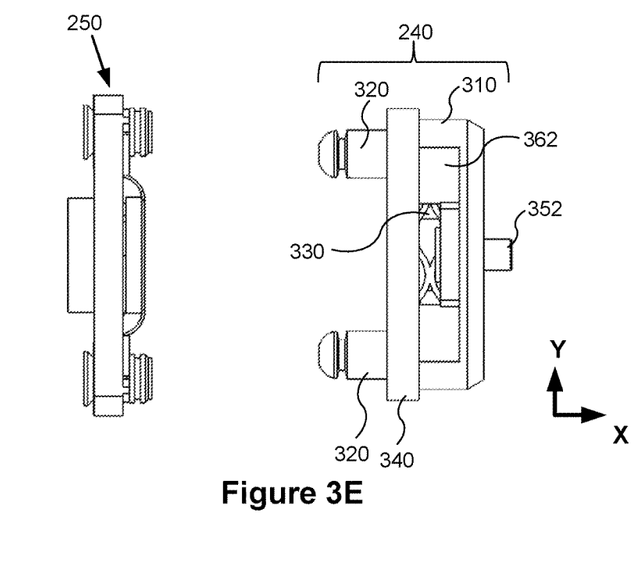
FIG. 3E is a side view of a coupling subsystem and a receiving structure in accordance with some embodiments.

FIG. 3E is a side view of the coupling subsystem 240 decoupled from the receiving structure 250 in accordance with some embodiments. As shown in FIG. 3E, the coupling subsystem 240 comprises the base 310, the one or more posts 320 to couple to the receiving structure 250, the spring 330 located between the spacer 340 and the base 310, and the one or more coupling elements 352 (e.g., screws) to couple the coupling subsystem 240 to the strap connector 230. Opposite ends of the spring 330 contact the spacer 340 and the base 310.

Figure 4A:
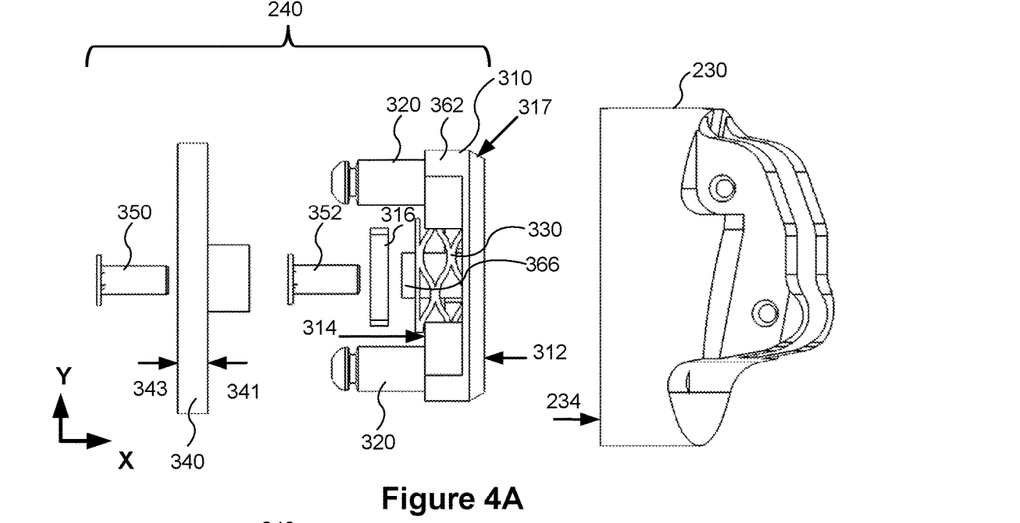
FIGS. 4A-4B are perspective views of components of a coupling subsystem and a strap connector in accordance with some embodiments.
Figure 4B:
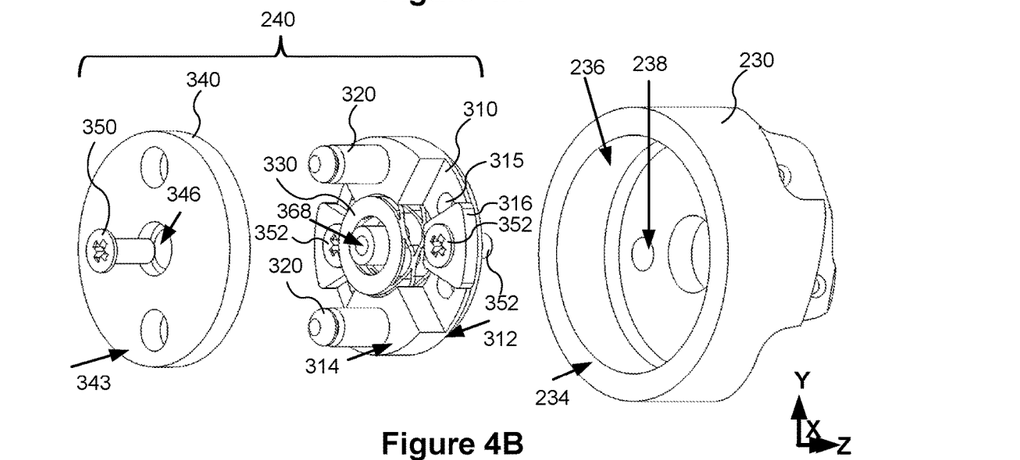

FIGS. 4A-4B are exploded views illustrating a plurality of components of the coupling subsystem 240 in accordance with some embodiments. In some embodiments, the base 310 is a circular boss 310 to locate the coupling subsystem 240 within the recessed portion 236 of the strap connector 230.

The circular boss 310 may have a tapered (e.g., beveled) side portion 317 near the surface on the side 312 of the circular boss 310 facing the strap connector 230 as shown in FIG. 4A. The side 312 of the circular boss 310 is to engage with the side 234 of the strap connector 230 as shown in FIG. 4B. The circular boss 310 has an opposite side 314 to the side 312 along the X dimension as shown in FIGS. 4A-4B. The one or more posts 320 extend from the side 314 of the circular boss 310 to couple to the strap 120 via the receiving structure 250 as shown in FIG. 3B.

In some embodiments, the strap connector 230 is rotatably coupled to the coupling subsystem 240. For example, the circular boss 310 is rotatably coupled to the strap connector 230.

As shown in FIG. 4B, the spring 330 contacts the side 314 of the circular boss 310 and is positioned between the circular boss 310 and the spacer 340. The spring 330 changes its length to detach the coupling subsystem 240 (e.g., the spacer 340 and circular boss 310) from the strap 120 when the plurality of posts 320 decouple from the receiving structure 250.

As shown in FIGS. 4A-4B, a plurality of coupling elements 352 are used to couple the circular boss 310 to the strap connector 230. For example, the plurality of coupling elements 352 (e.g., screws) insert from the side 314 (i.e., opposite to the side 312 along X dimension) of the circular boss 310 respectively. The coupling elements 352 respectively insert through a plurality of openings 315 in the circular boss 310 and out from the side 312 of the circular boss 310 (e.g., as shown in FIGS. 3E and 4B). When the circular coupling subsystem 240 is engaged with the strap connector 230, the coupling elements 352 respectively insert into the circular recessed portions 238 on the side 234 of the strap connector 230. For example, the coupling elements 352 include screws, bolts, or any other suitable fasteners.

Figure 4C:
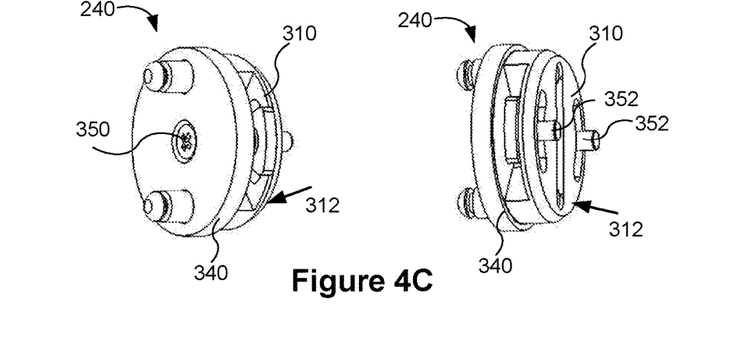
FIG. 4C shows perspective views of a coupling subsystem in accordance with some embodiments.

Still referring to FIGS. 4A-4B, a center coupling element 350 is used to couple the spacer 340 to the circular boss 310. The spacer 340 includes a side 341 facing the circular boss 310 and a side 343 opposite to the side 341 along the X dimension. In one example, the center coupling element 350 inserts from the side 343 of the spacer 340 through a center opening 346 of the spacer 340, into a center opening 368 of the circular boss 310. The center coupling element 350 includes screws, bolts, or any other suitable fasteners. The side 343 of the spacer 340 may be flat. FIG. 4C shows perspective views of the coupling subsystem 240 in accordance with some embodiments. As shown in FIG. 4C, the center coupling element 350 may not extend out from the side 312 of the circular boss 310 to reach the strap connector 230.

As shown in FIGS. 4A-4B, one or more spacers 316 are used between the coupling elements 352 and the circular boss 310 and positioned against the side 314 of the circular boss 310. The spacer 316 may have a shape that conforms to a portion of the circular boss 310 (e.g., as shown in FIG. 4B), or any other suitable shape (e.g., circular). The spacers 316 may be used to provide an improved fit and a level surface between the coupling elements 352 and the circular boss 310. The spacers 316 may also be used to fill gaps between the coupling elements 352 and the circular boss 310 subject to wear.

Figure 5A:
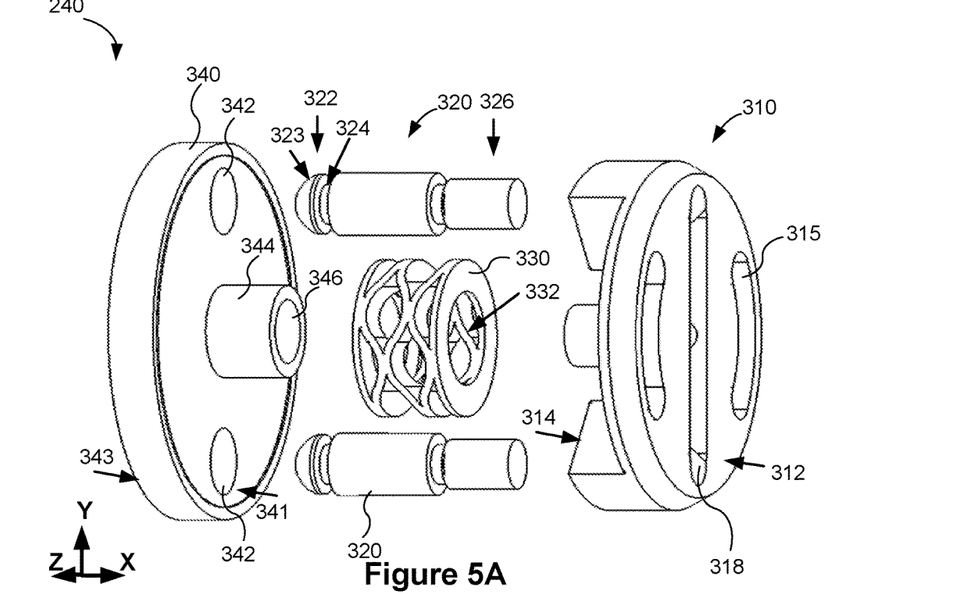
FIGS. 5A-5D are exploded views illustrating components of a coupling subsystem in accordance with some embodiments.
Figure 5B:
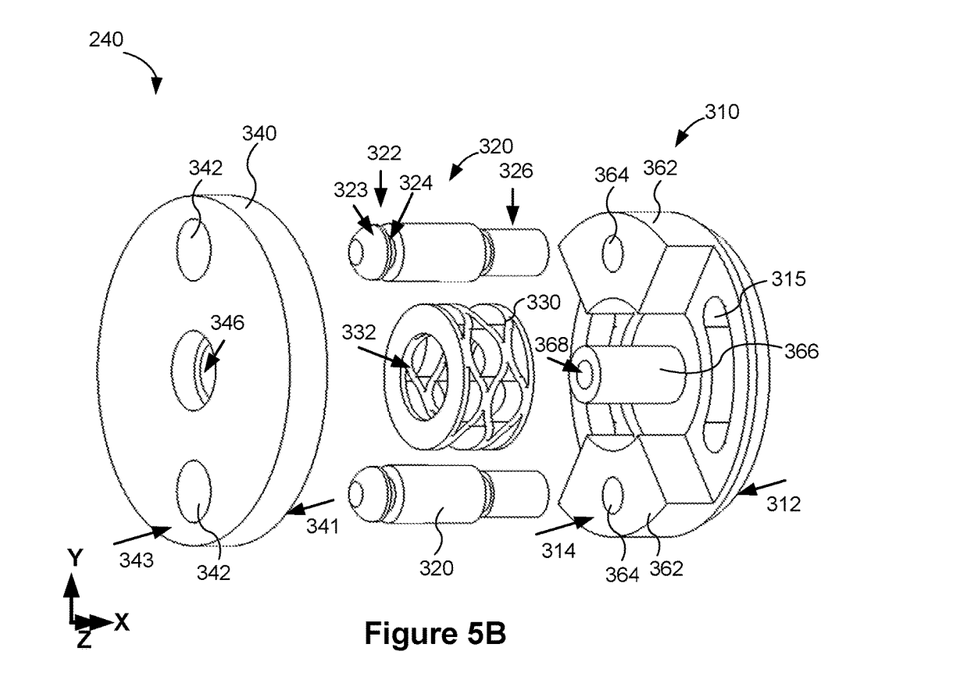
Figure 5C:
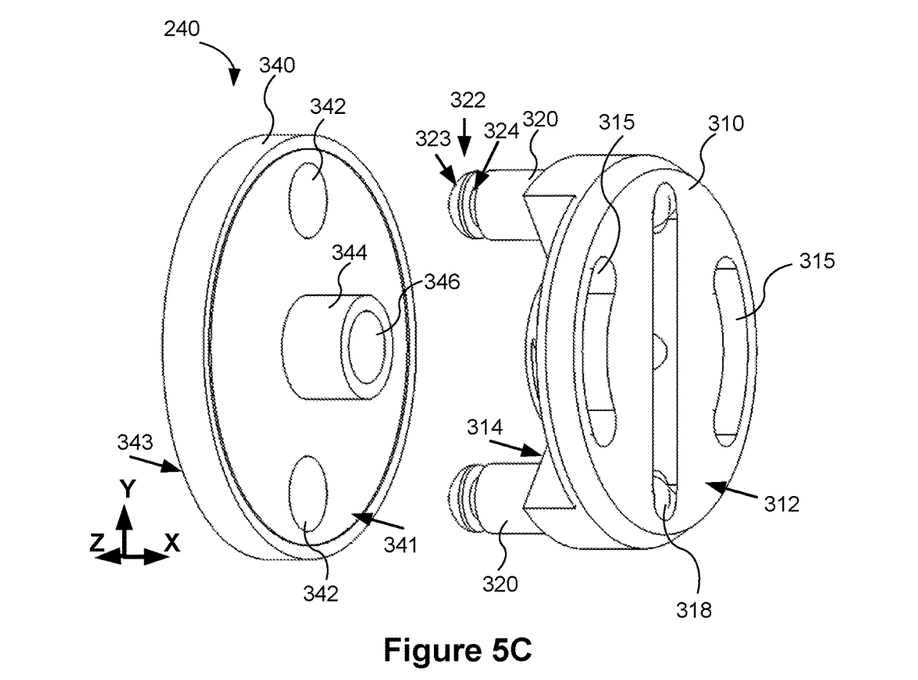
Figure 5D:
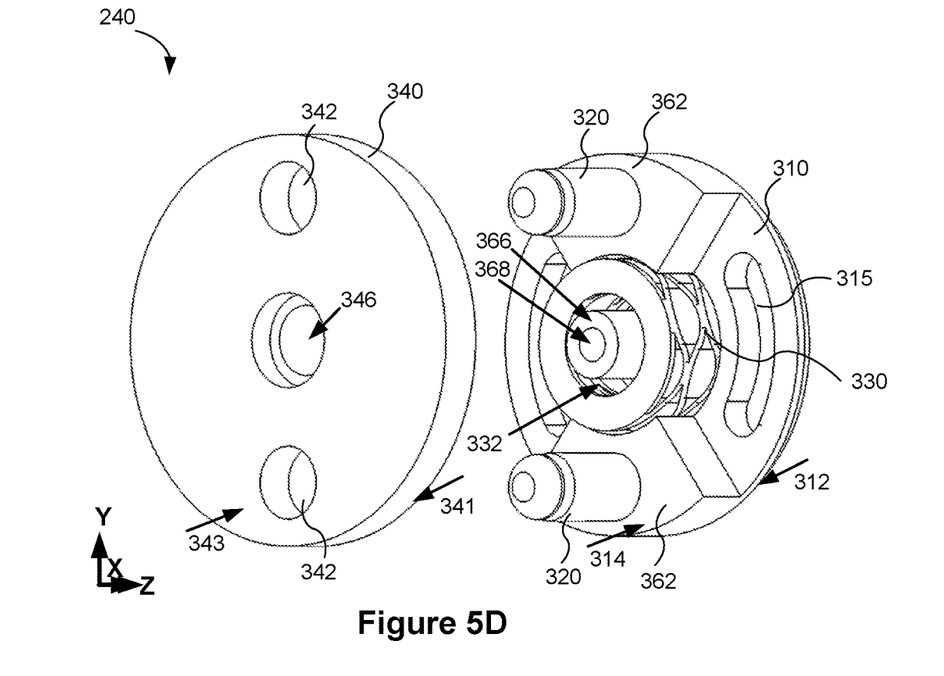

FIGS. 5A-5D are exploded views illustrating components of the coupling subsystem 240 in accordance with some embodiments. In some embodiments, the coupling subsystem 240 comprises a pair of posts 320. Each post 320 includes an end 326 (e.g., an elongated end) to be inserted into a respective opening 364 of a plurality of openings 364 in the circular boss 310 as shown in FIG. 5B. A diameter of the end 326 is designed to fit tightly in the opening 364 such that the post 320 is fixedly held in the opening 364 of the circular boss 310 as shown in FIG. 5D.

Each post 320 also includes an opposite end 322 to be inserted through an opening 342 of the spacer 340 and to couple to the strap 120. The end 322 includes a tip 323 to be inserted into a receiving portion on the strap 120 (e.g., an opening in the receiving structure 250). The end 322 also includes a groove 324 to engage with the receiving portion of the strap 120 (e.g., the groove 324 is to engage with concave edges of a latch in the receiving structure 250).

In some embodiments, each post 320 is circular. The groove 324 and the tip 323 of each post 320 are also circular. As shown in FIGS. 5A-5B, the diameter of the groove 324 is smaller than the diameter of the mid portion of the post 320, such that when the post 320 is coupled with the receiving structure 250, the post 320 is prevented from decoupling from the receiving structure 250.

In some embodiments as shown in FIG. 5B, each opening 364 of the plurality of openings 364 of the circular boss 310 extends through a respective protrusion 362 of a plurality of protrusions 362 that protrude from the side 314 of the circular boss 310. The respective protrusion 362 may have a shape that conforms to a portion of the circular boss 310 or any other suitable shape.

In some embodiments as shown in FIG. 5B, the circular boss 310 comprises a center opening 368 extending through a center protrusion 366 that protrudes from the side 314 of the circular boss 310. The spring 330 has a hollow center 332, and the center protrusion 366 is inserted into the hollow center 332 of the spring 330 as shown in FIG. 5D. In some embodiments, as illustrated in FIG. 4A, the center protrusion 366 of the circular boss 310 is longer than the respective protrusion 362 of the plurality of protrusions 362.

In some embodiments, referring back to FIG. 3E, when the spacer 340 is coupled with the circular boss 310 (e.g., while the audio subsystem 200 is engaged with the strap 120), the spacer 340 rests against the plurality of protrusions 362 of the circular boss 310. The spacer 340 includes a plurality of openings 342 through which the posts 320 are respectively inserted.

As shown in FIGS. 5A-5D, the spacer 340 includes a center protrusion 344 protruding from the side 341 of the spacer 340 and facing the circular boss 310. The spacer 340 includes a center opening 346 through the center protrusion 344 of the spacer 340. When the spacer 340 is coupled with the circular boss 310, the center protrusion 344 of the spacer 340 is inserted into the hollow center 332 of the spring 330, and the center protrusion 366 of the circular boss 310 is inserted into the center opening 346 of the spacer 340.

In some embodiments, the circular boss 310 includes a plurality of openings 315 and a center groove 318 on the side 312. The coupling elements 352 may insert through the respective openings 315 to couple the circular boss 310 to the strap connector 230. As shown in FIGS. 5A-5B, the plurality of openings 364 are diagonally distributed on a first diagonal of the circular boss 310, and the plurality of openings 315 are diagonally distributed on a second diagonal of the circular boss 310, in accordance with some embodiments.

Figure 6A:
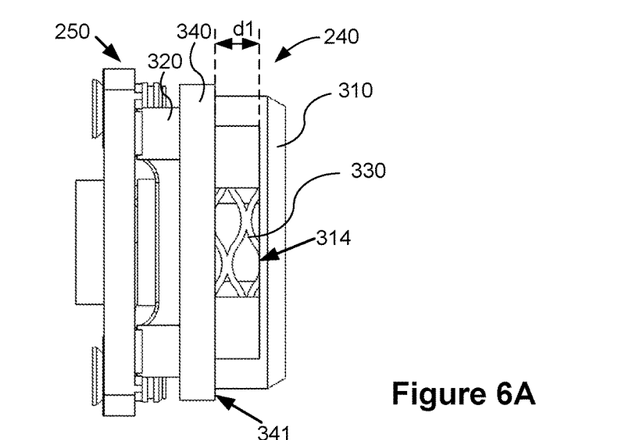
FIGS. 6A-6C are side views illustrating decoupling mechanisms between a coupling subsystem and a strap in accordance with some embodiments.
Figure 6B:
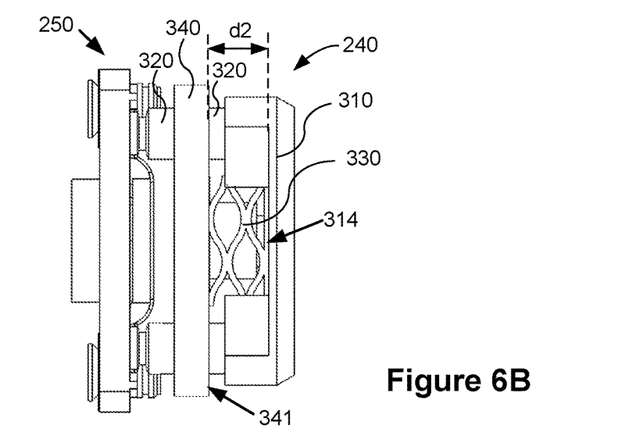
Figure 6C:
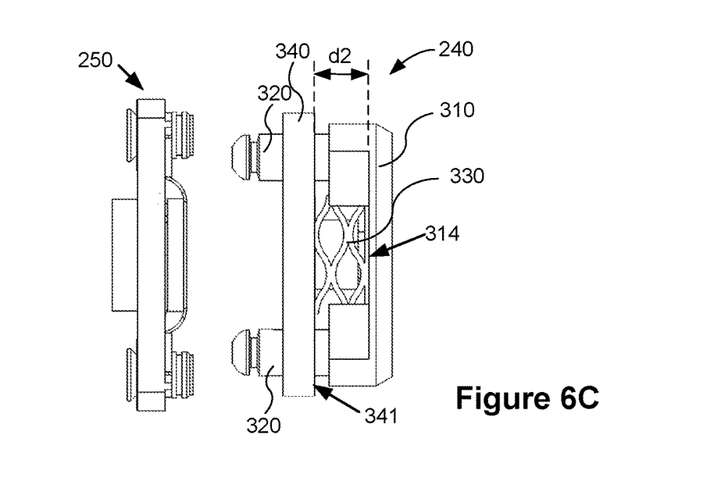

FIGS. 6A-6C are side views illustrating decoupling mechanisms between the coupling subsystem 240 and the strap 120 (e.g., the receiving structure 250 coupled to the strap 120) in accordance with some embodiments. The coupling element 350 (e.g., illustrated in FIG. 4C) may be used to couple the spacer 340 with the circular boss 310 while allow a relative movement along the X dimension between the spacer 340 and the circular boss 310.

In some embodiments, the spring 330 has one end contacting the side 314 of the circular boss 310 and the opposite end contacting the side 341 of the spacer 340. When the posts 320 are released from the receiving structure 250, the spring 330 deforms from a first state at a length of d1 to a second state at a length of d2, where d2 is greater than d1, such that the coupling subsystem 240 automatically detaches from the receiving structure 250. In one example, a natural length (unstretched and uncompressed) of the spring 330 is longer than a length of the center protrusion 344 of the spacer 340.

For example, the spring 330 has a natural length (i.e., an unstretched and uncompressed length) of d2. When the coupling subsystem 240 is coupled with the receiving structure 250, the spring 330 is in a compressed state with a length of d1. When the posts 320 are released from the receiving structure 250 (e.g., by releasing the grooves 324 from latches in the receiving structure), the spring 330 automatically changes from the compressed length d1 to the natural length d2. Simultaneously, the circular boss 310 moves along X dimension away from the spacer 340, and the coupling subsystem 240 detaches from the receiving structure 250. As illustrated in FIGS. 6A-6C, the distance between the side 314 of the circular boss 310 and the side 341 of the spacer 340 increases from d1 to d2 as the spring 330 changes from the compressed state to the natural state.

In another example, the length d2 is not the natural length of the spring 330, but a length longer than the compressed length d1 and shorter than the natural length of the spring 330.

Reversibly, the detached coupling subsystem 240 can couple to the receiving structure 250 by pressing the coupling subsystem 240 toward the receiving structure 250, such that the posts 320 are coupled with the receiving structure 250, and the spring 330 is compressed from the length d2 to the length d1.

In some embodiments, the coupling subsystem 240 further comprises suitable electrical connection mechanism(s) to provide power management and/or signal transmission between the speaker 210 and the head-mounted display 110.

In some embodiments, the one or more components of the coupling subsystem 240 are made of materials such as beryllium copper, gold, nickel, steel, stainless steel, polytetrafluoroethylene (PTFE), acetal copolymer, polycarbonate, other polymers and other metals.

The coupling subsystem 240 as can be used for attaching the speaker 210 to the strap 120, and detaching the speaker 210 from the strap 120 of the head-mounted display 110. The coupling subsystem 240 enables the speaker 210 to be removed from the user's ear without taking off the strap 120 and head-mounted display 110.

In some embodiments, the audio subsystem 200 offers multiple degrees of freedom to adjust the position of the speaker 210 to fit different users. The adjustments with multiple degrees of freedom include, but are not limited to, pivoting inward and outward relative to the user's ear, rotating within a vertical plane, and sliding upward and downward to adjust the height of the speaker 210. Various embodiments of the multiple degrees of freedom and related structures are described in U.S. patent application Ser. No. 14/627,639.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A detachable coupling structure for an audio system, the detachable coupling structure comprising:
 a base;
 a plurality of posts, extending from the base, to couple to a strap;
 a spring, contacting the base, to detach the plurality of posts from the strap when the plurality of posts decouple from the strap; and a spacer through which the plurality of posts extends, wherein the spring contacts the spacer.

2. The detachable coupling structure of claim 1, wherein the plurality of posts include a pair of posts.

3. The detachable coupling structure of claim 1, wherein each post of the plurality of posts comprises:
   a first end inserted into a respective opening of a first plurality of openings in the base, and
   a second end to couple to the strap, the second end comprising:
      a tip to be inserted into a receiving portion on the strap; and
      a groove to engage with the receiving portion of the strap.

4. The detachable coupling structure of claim 3, wherein the groove is circular.

5. The detachable coupling structure of claim 3, wherein the base is a circular boss.

6. The detachable coupling structure of claim 5, wherein a first side of the circular boss is to engage with a connector for an arm with a speaker.

7. The detachable coupling structure of claim 6, wherein the circular boss is to rotatably couple to the connector.

8. The detachable coupling structure of claim 5, wherein each opening of the first plurality of openings of the circular boss extends through a respective protrusion of a first plurality of protrusions on a second side of the circular boss.

9. The detachable coupling structure of claim 8, wherein:
   the circular boss further comprises a center opening through a center protrusion on the second side of the circular boss;
   the spring has a hollow center; and
   the center protrusion is inserted into the hollow center of the spring.

10. The detachable coupling structure of claim 9, wherein the center protrusion of the circular boss is longer than the first plurality of protrusions.

11. The detachable coupling structure of claim 9, wherein the spacer is positioned to rest against the first plurality of protrusions of the circular boss when the coupling subsystem is attached to the strap, the spacer comprising:
   a second plurality of openings through which the plurality of posts is inserted;
   a center protrusion on a first side of the spacer facing the base; and
   a center opening through the center protrusion of the spacer;
   wherein the center protrusion of the spacer is inserted into the hollow center of the spring and the center protrusion of the circular boss is inserted into the center opening of the spacer.

12. The detachable coupling structure of claim 11, wherein the spring has a first end to contact the second side of the circular boss and a second end to contact the first side of the spacer facing the base.

13. The detachable coupling structure of claim 11, wherein the spring is to reversibly deform from a first state to a second state to detach the plurality of posts from the strap when the plurality of posts decouples from the strap, wherein a distance between the base and the spacer is to increase as the spring changes from the first state to the second state.

14. The detachable coupling structure of claim 11, further comprising:
   a center coupling element to couple the spacer to the circular boss,
   wherein the center coupling element is inserted, from a second side of the spacer opposite to the first side of the spacer, through the center opening of the spacer, into the center opening of the circular boss.

15. The detachable coupling structure of claim 14, wherein the center coupling element includes a screw.

16. The detachable coupling structure of claim 14, wherein:
   the first plurality of openings is diagonally distributed on a first diagonal of the circular boss; and
   the second plurality of openings is diagonally distributed on a second diagonal of the circular boss.

17. The detachable coupling structure of claim 1, wherein the strap is a strap for a head-mounted display.

18. The detachable coupling structure of claim 17, wherein the base is to couple to an arm with a speaker.

* * * * *